Dec. 2, 1930.  A. R. RUTTER  1,783,547
METER HOUSING
Filed Dec. 21, 1922  2 Sheets-Sheet 1

WITNESSES:

INVENTOR
Argyle R. Rutter
BY
ATTORNEY

Dec. 2, 1930.  A. R. RUTTER  1,783,547
METER HOUSING
Filed Dec. 21, 1922  2 Sheets-Sheet 2
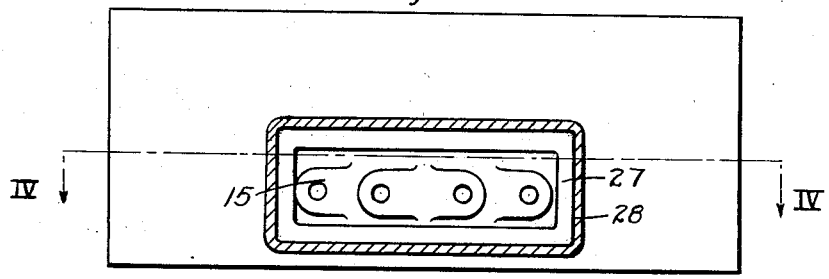
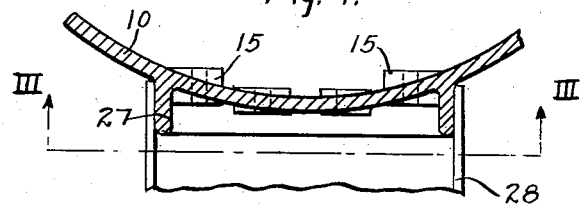
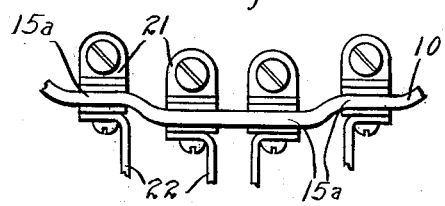
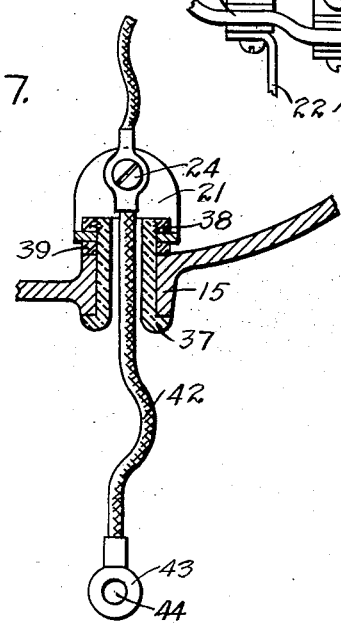
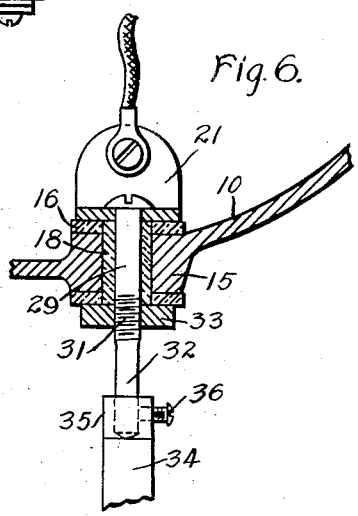
INVENTOR
Argyle R. Rutter
BY
ATTORNEY Patented Dec. 2, 1930

1,783,547

UNITED STATES PATENT OFFICE

ARGYLE R. RUTTER, OF EAST PITTSBURGH, PENNSYLVANIA, ASSIGNOR TO WESTINGHOUSE ELECTRIC & MANUFACTURING COMPANY, A CORPORATION OF PENNSYLVANIA

METER HOUSING

Application filed December 21, 1922. Serial No. 608,361.

My invention relates to meter casings and particularly to meter casings adapted for use in connection with associated housings.

One object of my invention is to provide a meter casing wherein the meter terminals, that is, the terminals for connecting the meter coils to the load and feed conductors are of such construction that they extend through the usual meter trim into the switch housing and are connected directly to the switch or fuse terminals within the housing.

Another object of my invention is to provide a meter casing having terminals that are relatively flexible and of such length that they may be connected directly to switch or fuse terminals within the switch housing, regardless of the relative spacing of the switch or fuse terminals.

Another object of my invention is to provide a casing with terminals having the above characteristics that may be assembled upon the meter casing at the factory and readily applied to a switch housing with a minimum of effort.

Certain meter constructions heretofore have been provided with casings having terminal housings extending therefrom that are integral parts of the casing and are closed by the cover of the meter trim or by a special cover. The coils of the meter are connected to binding posts mounted within the terminal housing and, in order to connect the meter to the switch within the switch housing, short conductors, such as flexible wire or the like, first were connected to the binding posts on the meter casing and then to the switch or fuse terminals within the housing. The meter casing thus constructed is comparatively expensive, and considerable inconvenience is experienced in connecting the meter to the switch terminals.

Another object of my invention is to provide a meter casing having terminals that may be connected directly to the switch or fuse terminals without necessitating additional connectors and wherein the complete construction is less expensive than the construction above described.

These and other objects, that will be made apparent throughout the further description of my invention, are attained by means of the apparatus hereinafter described, and illustrated in the accompanying drawings, wherein:

Fig. 3 is a view similar to that of Fig. 2, showing a modified meter casing;

Fig. 4 is a vertical section taken on the line IV—IV of Fig. 3, showing a portion of the meter casing;

Fig. 5 is an elevational view of a fragment of a modified form of meter casing;

Fig. 6 is a vertical section through a portion of the meter casing, showing a modified form of terminal, and Fig. 7 is a view similar to that of Fig. 6, showing a further modification of the terminal device.

Figure 1:
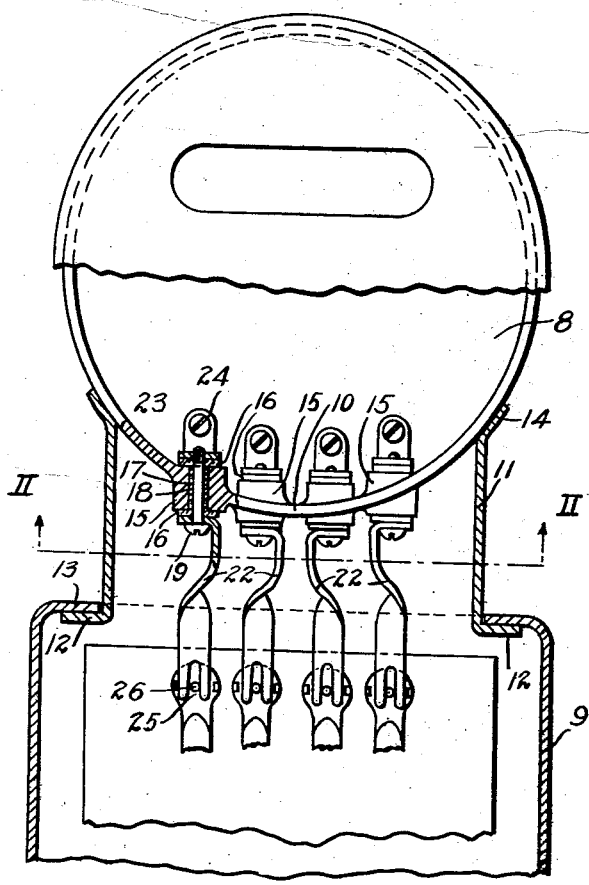
Figure 1 is an elevational view of the terminal apparatus showing the meter switch and meter trim in vertical section.
Figure 2:
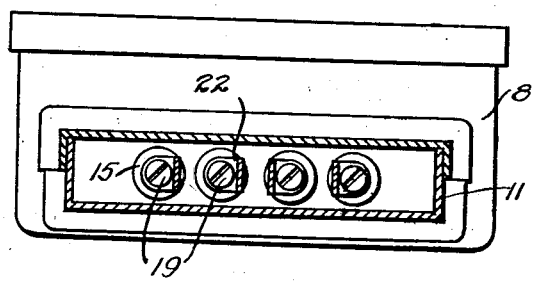
Fig. 2 is a transverse section of the apparatus shown in Fig. 1, taken on the line II—II thereof.

Referring to the drawings, the apparatus includes a meter casing 8 that may be made of cast iron or pressed from sheet metal and, as indicated in Fig. 1, is made of cast metal. The casing is of the standard circular shape and is adapted to be connected to a sheet-metal switch housing 9 by a sheet-metal meter trim 11 having flanges 12 that are connected to the end flanges 13 of the switch casing. The other end of the trim 11 is also provided with flanges 14 that fit against the side wall of the meter casing 8.

The trim 11 serves to provide a dust-proof enclosure for the meter terminals and the open end of the switch housing. The side wall 10 of the meter casing is provided with a series of integral bosses 15 which afford flat faces for receiving insulating washers 16 used in connection with the terminal devices. The bosses are provided with openings 17 in which tubular bushings 18 are disposed.

Threaded bolts 19 extend through the bushings and serve to secure the meter-coil terminal clips 21 and the line and load terminals 22 to the casing wall 10. The clips 21 are provided with threaded holes 23 into which the threaded ends of the bolts 19 are inserted. The clips are also provided with terminal screws 24 for attaching the meter-coil terminals to the clips.

The terminal members 22 are made of flat flexible bars, bent as indicated in Fig. 1, and are provided, at their free ends, with slots 25 for receiving the terminal screws 26 of the switch and fuse apparatus within the housing 9. The terminal screws 26 are associated with the switch and fuse terminals in the usual manner, and a meter may be connected to the switch apparatus by simply clamping the slotted ends of the terminals 22 in operative connection with their respective switch or fuse terminals. The terminal members 22 are of such construction that they may be flexed in any desired direction to accommodate various depths of switch or fuse panel blocks having variously spaced terminals.

By reason of this construction, a meter having the terminals 22 assembled thereon at the factory may be applied to any standard enclosed switch mechanism by simply connecting the free ends of the terminals to the switch or fuse terminals within the housing. The construction is simple and provides an inexpensive meter casing.

Referring to Figs. 3 and 4, wherein a modified form of meter casing is illustrated, the casing wall 10 is provided with an integral rectangular flange 27 having a contour similar to the contour of a meter trim 28. The flange 27 provides a dust-lap between the casing wall 10 and the meter trim without necessitating a flange upon that portion of the trim in engagement with the meter casing. The casing wall is provided with bosses 15 similar to those illustrated in Fig. 1 and for the purpose described above.

In Fig. 5 is illustrated a modified form of housing wherein the meter casing is made of sheet metal and wherein the side wall is provided with offset portions 15ª which correspond to, and serve the same purpose as, the bosses 15 illustrated in Fig. 1.

Referring to Fig. 6, a modified form of terminal member is illustrated wherein a single threaded bolt 29 serves as the terminal for connecting the meter coils to the switch or fuse terminals. The bolt 29 is provided with a threaded portion 31 and a reduced portion 32 of circular cross-section. The casing wall 10 is provided with a perforated boss 15, and insulating bushings 18 and washers 16, respectively, are employed in a manner similar to that of the device illustrated in Fig. 1.

The bolt 29 serves to secure the terminal clip 21 to the inner side of the casing wall and the bolt is clamped in operative position by means of a threaded nut 33.

When this form of terminal member is used, it is necessary to have a special switch or fuse terminal 34 having a tubular portion 35 integral therewith and provided with a set screw 36 for clamping the terminal 32 in operative engagement therewith. The terminal bolt 29 is of sufficient length to extend entirely through the meter trim and project into the switch housing.

A further modified form of terminal device is illustrated in Fig. 7 wherein an insulating bushing 37 extends through the boss 15 of the meter wall 10 and is retained in position by a threaded nut 38 which clamps the coil terminal 21 between an insulating washer 39 and the nut 38. The terminal screw 24 serves to secure a meter-coil terminal 41 and a flexible conductor terminal 42 to the clip 21. The terminal 42 is provided with a standard clip 43 having a perforation 44 for receiving the terminal screw of the fuse or fuse terminals. The length of the terminal 42 is sufficient to extend entirely through the meter trim into the housing.

From the foregoing, it will be apparent that meter casings may be constructed in a variety of ways and that one meter-casing construction may be adapted for a variety of fuse and switch housings and that various forms of meter trim may be adapted for use with the improved meter casing.

By reason of the compact arrangement of the meter terminals, as indicated in the drawings, it is possible to use shorter meter trims than the standard trims indicated and, therefore, the overall dimensions of the meter and the switch-housing unit may be materially reduced.

While I have described and illustrated several embodiments of my invention, it will be apparent to those skilled in the art that various changes, modifications, substitutions, additions and omissions may be made therein without departing from the spirit and scope of my invention, as set forth in the appended claims.

I claim as my invention:

1. In a mounting for an electric meter, the combination with an encased meter element having terminal means secured to, and extending through, the casing thereof for electrical connection with the operating element of said meter, of a casing for association with said meter having terminal means therein in alignment with an aperture in the casing, substantially rigid terminal members secured to the terminal means on said meter casing and projecting therefrom for cooperation with the terminal means in said associated casing, and a tubular collar surrounding said terminal members and cooperating with the said meter casing and associated casing for completely enclosing said terminal members and for maintaining said casings in operative spaced relation.

2. In combination with an encased electrical measuring instrument and a casing for association therewith having contacts secured therein for electrical connection with an electrical circuit of substantial rigid contact means secured to, and projecting through, a wall of the casing of said measuring instrument and disposed to cooperate with the terminals in said associated casing, and means for maintaining said measuring instrument and associated casing in operative relation.

In testimony whereof, I have hereunto subscribed my name this 14th day of December, 1922.

ARGYLE R. RUTTER.